United States Patent Office 2,757,052
Patented July 31, 1956

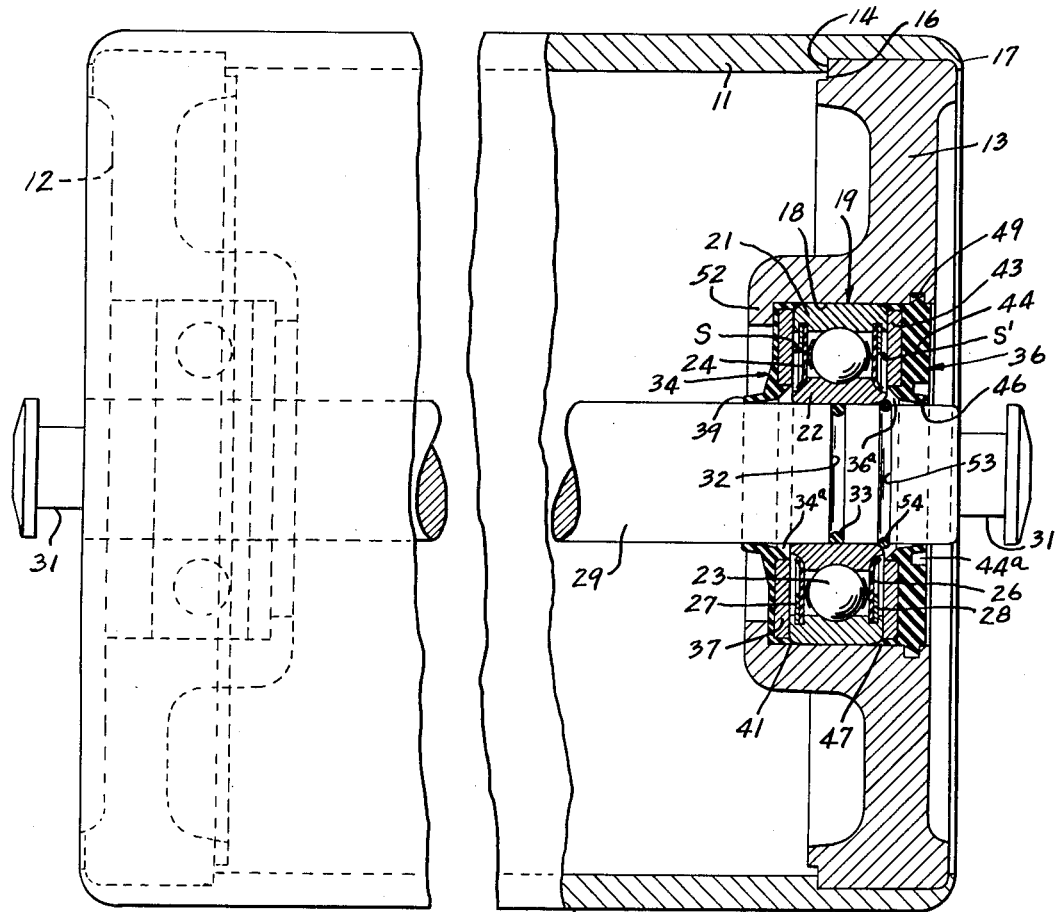
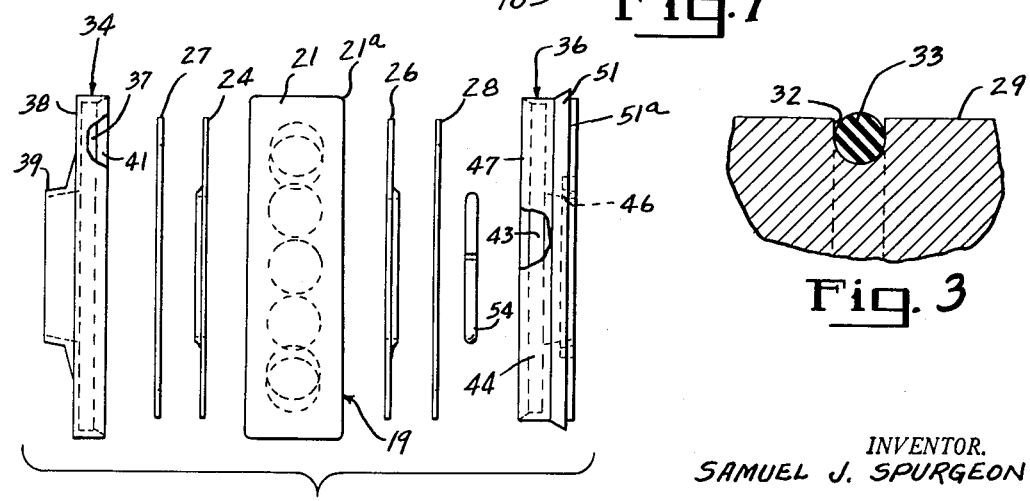

2,757,052

BEARING MOUNTING AND SEALS FOR IDLER ROLLS AND THE LIKE

Samuel J. Spurgeon, Birmingham, Ala.

Application March 20, 1952, Serial No. 277,579

6 Claims. (Cl. 308—187.1)

My present invention relates to bearing mountings for idler rolls and the like and to means for protecting anti-friction bearings against the damaging effects of foreign matter. My invention relates more particularly to means for accomplishing this purpose indirectly by providing seals effective to protect the built-in seals with which the so-called "sealed" bearings are provided.

In my co-pending application, Serial No. 162,980, filed May 19, 1950, now Patent No. 2,647,808, dated August 4, 1953, "Bearing Mounting for Idler Rolls and the Like," I show, describe and claim a bearing mounting for idler rolls which comprises an arrangement of metal and resilient washers so spaced relative to the built-in seals of the bearing as to provide spaces at the ends of the bearing. In these spaces I place a quantity of semi-fluid material which may well be a lubricant and this material remains in these spaces to intercept foreign matter getting into the assembly before it reaches the built-in seals. Consequently, such material prevents the foreign matter from reaching the seals, thus prolonging the life of the bearing. While this construction has proven very satisfactory for its intended purposes, the present invention is, for certain uses and under certain conditions, an improvement thereover. Generally speaking, the present bearing mounting is somewhat less complicated than the one described in the co-pending application mentioned above. Further, the present bearing mounting embodies auxiliary sealing washers having improved sealing means cooperating with the roll axle and embodies means to hold the outer race of the bearing against rotation in the bore of the roll head. My improved bearing mounting embodies means effective to hold the inner race against rotation relative to the axle and which nevertheless permits the bearing to be somewhat self-aligning, relieving the strains due to preloading which occur when both the inner race and outer race are pressed into and over the respective cooperating parts of the roll and axle.

In view of the above an object of my invention is to provide a mounting for anti-friction bearings which shall have spaced outwardly of the ends auxiliary seals in the form of rubber gaskets or seal members, the rubber seals being assembled in the bearing recess in such manner as to provide lubricant receiving spaces at the ends of the bearing and so arranged as to frictionally grip the outer race of the bearing therebetween thus holding the outer race against rotation relative to the roll head and preventing foreign matter from contacting the bearing.

Another object is to provide, in association with the features just mentioned, an annular rubber ring placed in a groove in the axle and disposed to be deformed when the inner race of the bearing is slid onto the shaft over the ring, thus providing means holding the inner race against rotation while permitting slight axial movement of the inner race thus to prevent imposing preloading stresses on the bearings as might be the case if the races were pressed into the bore and onto the axle.

A more general object of my invention is to provide auxiliary seal means for anti-friction bearings which shall be simple of construction and installation and in which the seals themselves are effective to lock and secure the outer race of the bearing in the bore of the roll head or the like in which the bearing is installed, and which when in place is difficult to withdraw, thus assuring that the outer race is held against rotation.

A bearing mounting illustrating the features of my invention is shown in the accompanying drawings forming a part of this application in which:

Fig. 1 is a fragmental side elevational view of an idler roll with one of the bearings and heads in section;

Fig. 2 is a detail exploded view of the bearing and my improved auxiliary seals, the two built-in seals of the bearing also being removed for the purpose of illustration; and, Fig. 3 is an enlarged fragmental detail sectional view of a portion of the axle which is provided with the annular groove for receiving the rubber ring to hold the inner race against rotation, the view being taken with the race removed.

Referring now to the drawings for a better understanding of my invention I show my improved bearing mounting associated with a conveyor idler roll indicated generally by the numeral 10. In the manner well understood, the roll 10 may comprise an outer cylindrical shell 11 provided at each end with heads 12 and 13. The inner surface of the shell 11 may be shouldered as at 14 to engage with a complementary shoulder 16 on the heads. The heads may be held in place by rolling or forming over the ends of the shell 11 as indicated at 17.

In view of the fact that the heads 12 and 13 are identical a description of one will suffice for both. The head 13 is provided with a centrally disposed bearing recess or bore 18 within which is adapted to be placed an anti-friction bearing such as a ball bearing indicated generally by the numeral 19. The ball bearing 19 may comprise the usual outer race 21, the inner race 22 and a row of ball bearings 23 between the races. Also, the ball bearing 19 may be provided with built-in seals 24 and 26 in the form of rubber washers, the inner peripheries of which wipe the sides of the inner race as illustrated. The seals 24 and 26 may be held in place by locking rings 27 and 28 which fit in internally disposed grooves within the outer race 21.

The ball bearing 19 is disposed to fit about a centrally disposed axle 29, the inner race 22 being adapted to fit slidably over the axle 29. The axle may be provided with notched out ends 31 for receiving the complementarily notched standards of a roll supporting framework.

The axle 29 is provided with an annular groove 32 located at the point therealong over which the inner race 22 will be placed when the bearing mounting is finally assembled. Disposed in the groove 32 is an annular ring 33 of rubber or the like. The relative depth of the groove 32 and the size of the ring 33 are such that when the bearing race 22 is forced over the rubber ring, the rubber thereof flows in such manner as to frictionally grip the inner race and hold the same against rotation. However, the inner race 22 can move slightly longitudinally of the axle 29 for a purpose later to appear.

My improved auxiliary seals are indicated generally by the numerals 34 and 36. For the purpose of description the seal 34 will be referred to hereinafter as the "inner seal" whereas the seal 36 will be referred to as the "locking seal." However, it will be apparent as the description proceeds that these terms are relative only since either seal may be employed at the inner or outer end of some types of bearing mounting recesses.

Considering first the seal 34 it will be seen that the same comprises an annular washer 37 of relatively rigid material such as steel or iron having vulcanized or otherwise bonded thereto an annular washer-like rubber portion 38. The rubber portion of the washer 34 has a centrally disposed, outwardly extending seal portion 39 adapted to encircle the axle 29 with a close running fit. The inner surface of the portion 39 tapers as illustrated in Fig. 1 so that in effect contact with axle 29 is had over a relatively narrow axial length of the portion 39, adjacent the end thereof. The surface of the seal member 34 opposite the sealing portion 39 overhangs the inner face of the washer 37 as illustrated at 41. Further, the portion 41 is triangular in transverse section as indicated so that there is a circular, wedge shaped section of flexible material which is adapted to wedge between the bore 18 and the side of the outer race 21 of the bearing 19. It will be noted that the outer race of the bearing is provided with the usual rounded corners 21a, and these corners aid in permitting the wedging action of the wedge-shaped portion 41 in the manner to appear.

The outer or locking seal 36 also embodies a washer 43 of relatively rigid material such as steel or iron. Vulcanized or otherwise bonded to the washer 43 is a body 44 of rubber which has an outwardly projecting axle engaging sealing portion 46, similar in all respects to the portion 39 of washer 34. The thickness of the member 36 may be greater than the thickness of the member 34 for a reason also later to appear. To add flexibility to the end of the portion 46 the outer face of the rubber 44 may be grooved as at 44a. The member 36 is provided along its inner face with a circular portion 47 which is tapered as indicated thereby to wedge against the opposite side of the outer race, adjacent the periphery thereof.

The bore 18 of the head 13 is provided with an internal, annular groove 49. Projecting radially outward from the outer periphery of the rubber portion 47 of the member 36 is a triangular shaped annular rib 51. The flat radially disposed side 51a of the rib 51 is disposed to snap behind the outer radially disposed wall of the groove 49, thus to lock the member 36 in place within the bore 18. Further, the relative thickness of the members 34 and 36 is such that when assembled with the bearing, the locking in of the rib 51 is fully effective to force the entire sealing assembly inwardly. This presses the sealing washer 34 into contact with a shoulder 52 at the inner end of the bore and locks the outer race against rotation by the wedging action already mentioned.

It will be noted that the axle is provided with a second annular groove 53. The groove 53 is adapted to receive a locking ring 54 which is effective to engage against the outer side of the inner race 22, thus to hold the bearing against moving outwardly toward the adjacent end of the shaft. It will thus be seen that with the ring 54 in place the outer race of the bearing is effectively clamped between the sealing members 34 and 36, the stop shoulder 52 serving to hold the parts against movement toward that end of the recess.

It will be further noted that adjacent the inner periphery of the members 34 and 36 I provide enlarged annular cut out portions 34a and 36a, respectively. The purpose of this cutting away the central part of the sides of the members 34 and 36 adjacent the bearings is twofold. First, I find that this clearance in the form of the annular spaces shown causes any foreign matter that may enter under the seals 39 and 46 to tend to be pushed away from the bearing. Secondly, with respect to the member 36, the space 36a provides adequate clearance for the locking ring 54 to be employed in the manner shown.

From the foregoing the method of constructing and using my improved bearing mounting may now be explained and understood. In assembling the device the first step is to place the seal 34 in the bore 18, placing it in contact with the shoulder 52. When this is done a small amount of lubricant-like material such as cup or bearing grease or the like is placed on the inner face of the member 34. When the bearing 19 is placed in the recess 18 it contacts the metallic washer 37 in the manner shown in Fig. 1. It will be noted that there is defined between the metallic washer and the built-in seal 24 a space indicated by the letter S. This space, together with that provided by cutting away the washer 34 at 34a provides a space sufficient to hold an appreciable quantity of the lubricant. The rubber washer 33 is placed in its groove 32 and locking ring 54 is put in place after the bearing 19 is inserted. The bearing 19 is now put in place and a second quantity of lubricant is placed on the outer side thereof and the locking seal 36 is inserted. Upon forcing the seal 36 inwardly and snapping the rib 51 into the groove 49, the assembly is complete. It will thus be seen that the space S' between the metal washer 43 and the seal 36 is likewise filled with the lubricant just mentioned when the device is completely assembled.

From the foregoing it will be apparent that I have devised an improved bearing mounting which is simple of construction and operation. In practice, when foreign matter is present adjacent the points 39 and 46 its entry into contact with the built-in seals 24 and 26 is prevented both by the mechanical sealing action of the extensions 39 and 46 and by the presence of the lubricant in the spaces S and S'. The combination of these two factors assures long life for the bearing whether or not the same is equipped with the built-in seals.

Another feature of my invention as previously mentioned lies in the fact that the outer race may fit rather loosely in the bearing recess and the inner race 22 may fit rather loosely over the shaft or axle 29. Therefore, when the parts are assembled the bearing is not pre-loaded as is usually found to be the case when the outer race is pressed into its recess and the inner race is pressed over the axle. In other words, the inner race can shift slightly axially to the left as viewed in Fig. 1. Similarly, while the outer race 21 is locked against rotation in the bearing recess, nevertheless, the same can shift slightly through distortion of the rubber of the auxiliary seals. The outer race thus is free to accommodate itself to the non-loaded position relative to the balls and the inner race. This arrangement assures long life for the built-in seals and consequently assures long life for the bearing itself.

While I have shown the auxiliary washers 34 and 36 as embodying metallic washers 37 and 43, with some types of resilient material it may be possible to omit the same. With those types of resilient material which tend to flow when compressed I find that the metalic washers reduce the tendency to flow and thus cause the resilient body portions of the seals to maintain the desired shape. For instance, a composite sealing washer formed of certain of the synthetic rubbers having incorporated therein glass fibers may, under certain conditions, be satisfactory without the use of the inner washers of relatively rigid material.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:
1. In a mounting for an anti-friction bearing of the type having built-in seals at each end, a hub having a bore for receiving the bearing, a stop shoulder at the inner end of the bore, an inner sealing washer of resilient material in the bore fitting against the shoulder and spaced from the adjacent built-in seal to provide a space therebetween for a quantity of semi-fluid material, an outer sealing washer of resilient material in the bore spaced from the adjacent built-in seal and providing a space therebetween for receiving a quantity of semi-fluid material, there being an annular internal groove in the walls of the hub defining the bore thereof, an annular locking lip on the outer sealing washer disposed to engage in the groove and thereby lock the washer in the hub bore, said sealing washers being thick enough to clamp between them and hold against rotation an outer peripheral part of the bearing and a stationary axle passing through the sealing washers and the bearing.

2. In a mounting for an anti-friction bearing of the type having built-in seals at each end, a hub having a bore for receiving the bearing, a stop shoulder at the inner end of the bore, an inner sealing washer of resilient material in the bore fitting against the shoulder and spaced from the adjacent built-in seal to provide a space therebetween for a quantity of semi-fluid material, an outer sealing washer of resilient material in the bore spaced from the adjacent built-in seal and providing a space therebetween for receiving a quantity of semi-fluid material, there being an annular internal groove in the walls of the hub defining the bore thereof, an annular locking lip on the outer sealing washer disposed to engage in the groove and thereby lock the washer in the hub bore, tapered ring-like portions on the faces of the resilient sealing washers adjacent the bearing which tend to wedge between the outer periphery of the bearing and the walls of the hub bore when the mounting is assembled, thereby restraining a part of the bearing against rotation relative to the hub bore, and a stationary axle passing through the sealing washers and the bearing.

3. In a mounting for an anti-friction bearing of the type having inner and outer races and built-in seals at each end, a hub having a bore for receiving the bearing, a stop shoulder at the inner end of the bore, an inner a sealing washer of resilient material in the bore fitting against the shoulder and spaced from the adjacent built-in seal to provide a space therebetween for a quantity of semi-fluid material, an outer sealing washer of resilient material in the bore spaced from the adjacent built-in seal and providing a space therebetween for receiving a quantity of semi-fluid material, there being an annular internal groove in the walls of the hub defining the bore thereof, an annular locking lip on the outer sealing washer disposed to engage in the groove and thereby lock the washer in the hub bore, a stationary axle passing through the sealing washers and the bearing, and a sealing member between the inner race and the axle.

4. The combination with an anti-friction bearing of the type having inner and outer races and wherein the outer race is disposed in the bore of a hub or the like, of inner and outer sealing washers of resilient material in the bore spaced from parts of the bearing to provide spaces at the ends thereof for receiving quantities of semi-fluid material, wedge shaped annular sections on the inner faces of the washers disposed to wedge into the annular spaces defined at the junction of the periphery of the outer race and the walls of the hub bore, means holding the washers in place in the hub bore with the bearing clamped between the same and with the said wedge shaped sections in said annular spaces, a non-rotatable axle passing through the hub about which the inner race fits, and a sealing member between the axle and said inner race.

5. Apparatus as defined in claim 4 in which the means holding the bearing clamped between the washers comprises an internal annular groove in the walls of the bore located adjacent one of said washers, and an annular locking ring formed integrally with the washer adjacent said groove and disposed to snap into said groove and restrain the said washer against movement away from the bearing.

6. In a mounting for an anti-friction ball bearing having inner and outer races and built-in seals at each end, a hub having a cylindrical bore in which the outer race of the bearing fits, a non-rotatable axle in the bore over which the inner race fits, a stop shoulder at the inner end of the bore, a sealing washer having one face resting against the stop shoulder and an annular portion cooperating with the axle to form a seal around the axle, the other face of said washer contacting the outer race of the bearing and thereby being held in spaced relation to the adjacent built-in seal, a second sealing washer similar to the first one located at the other end of the bearing and similarly held spaced from the built-in seal adjacent thereto and cooperating with the axle, and a locking ring portion projecting outwardly of the periphery of the second washer, there being an annular circumferential groove in the hub bore within which the locking ring fits, said groove and locking ring portion of the washer being so located that the outer race of the bearing is resiliently clamped between the sealing washers when the parts are assembled in the hub bore.

References Cited in the file of this patent

UNITED STATES PATENTS

| | | |
|---|---|---|
| 1,906,521 | Boden | May 2, 1933 |
| 2,054,581 | Delaval-Crow | Sept. 15, 1936 |
| 2,181,203 | Reynolds | Nov. 28, 1939 |
| 2,275,325 | Searles | Mar. 3, 1942 |
| 2,310,405 | Dodge | Feb. 9, 1943 |
| 2,434,686 | Clayton-Wright | Jan. 20, 1948 |
| 2,454,036 | Clayton-Wright | Nov. 16, 1948 |
| 2,467,210 | Helfrecht | Apr. 12, 1949 |
| 2,473,267 | Wightman | June 14, 1949 |
| 2,587,405 | Stevens et al. | Feb. 26, 1952 |
| 2,592,387 | Brown | Apr. 8, 1952 |
| 2,647,808 | Spurgeon | Aug. 4, 1953 |